United States Patent
Rudolf

(10) Patent No.: US 7,693,123 B2
(45) Date of Patent: Apr. 6, 2010

(54) SYSTEM AND METHOD USING PRIMARY AND SECONDARY SYNCHRONIZATION CODES DURING CELL SEARCH

(75) Inventor: Marian Rudolf, Montreal (CA)

(73) Assignee: InterDigital Technology Corporation, Wilmington, DE (US)

(*) Notice: Subject to any disclaimer, the term of this patent is extended or adjusted under 35 U.S.C. 154(b) by 1407 days.

(21) Appl. No.: 10/307,082

(22) Filed: Nov. 27, 2002

(65) Prior Publication Data

US 2003/0133431 A1    Jul. 17, 2003

Related U.S. Application Data

(60) Provisional application No. 60/334,345, filed on Nov. 29, 2001.

(51) Int. Cl.
*H04B 7/216* (2006.01)
(52) U.S. Cl. .................. 370/342; 455/434
(58) Field of Classification Search .............. 370/342, 370/335, 441, 324, 337, 345
See application file for complete search history.

(56) References Cited

U.S. PATENT DOCUMENTS

| 6,134,283 A | 10/2000 | Sands et al. |
| 6,167,037 A | 12/2000 | Higuchi et al. |
| 6,385,264 B1 * | 5/2002 | Terasawa et al. ............ 375/371 |
| 6,831,929 B1 * | 12/2004 | Sriram et al. ............... 370/515 |
| 6,834,046 B1 * | 12/2004 | Hosur et al. ................ 370/335 |
| 6,934,245 B2 * | 8/2005 | Kwak et al. ................. 370/204 |
| 2001/0019576 A1 | 9/2001 | Nystrom et al. |
| 2002/0060996 A1 | 5/2002 | Kwak et al. |

FOREIGN PATENT DOCUMENTS

| CA | 2507751 | 12/2000 |
| CN | 1292631 | 4/2001 |
| EP | 1065825 | 1/2001 |
| JP | 09-247744 | 9/1997 |
| JP | 11-122141 | 4/1999 |
| JP | 2000-32565 | 1/2000 |
| JP | 2000/358266 | 12/2000 |
| JP | 2000-358266 | 12/2000 |
| JP | 2001/060915 | 3/2001 |
| JP | 2001-145151 | 5/2001 |
| JP | 2001/145151 | 5/2001 |
| JP | 2001/160798 | 6/2001 |

(Continued)

OTHER PUBLICATIONS

Wiely, Harri Holma and Antti Toskala, "WCDMA for UMTS," Jun. 2000; pp. 102-106.

(Continued)

*Primary Examiner*—Rafael Pérez-Gutiérrez
*Assistant Examiner*—Marcos Batista
(74) *Attorney, Agent, or Firm*—Volpe and Koenig, P.C.

(57) ABSTRACT

A system and method for improved cell searching includes a subframe having a Primary Synchronization Code, which is comment to all Node Bs in the system and is used to indicate the positions of a set of Secondary Synchronization Codes. This greatly simplifies the cell searching procedure and improves cell search performance. In one embodiment, the Primary Synchronization Code is sent in the PCCPCH and the Secondary Synchronization Codes the are sent in the DwPTS timeslot.

15 Claims, 3 Drawing Sheets

FOREIGN PATENT DOCUMENTS

| | | |
|---|---|---|
| JP | 2001/168765 | 6/2001 |
| JP | 2001-168765 | 6/2001 |
| JP | 2001160798 | 6/2001 |
| JP | 2001/298783 | 10/2001 |
| KR | 2002/034651 | 5/2002 |
| KR | 2002034651 | 5/2002 |
| KR | 2001/017277 | 6/2002 |
| KR | 2001017277 | 6/2002 |
| TW | 393842 | 6/2000 |
| TW | 461199 | 10/2001 |
| TW | 462149 | 11/2001 |
| WO | 97/07646 | 2/1997 |
| WO | 99/00912 | 1/1999 |
| WO | 99/12295 | 3/1999 |
| WO | 99/13675 | 3/1999 |
| WO | 00/57569 | 9/2000 |
| WO | 00/62447 | 10/2000 |
| WO | 00/65736 | 11/2000 |
| WO | 00/67399 | 11/2000 |
| WO | WO 00/65736 | * 11/2000 |
| WO | 00/74276 | 12/2000 |
| WO | 01/72080 | 9/2001 |
| WO | 01/91337 | 11/2001 |

OTHER PUBLICATIONS

"UMTS Terrestrial Radio Access Concept Evaluation", ETSI Technical Repor, XP-002109765, pp. 47-48, (Dec. 1997).

Mitjana et al., "Performance Of Smart Antenna In TD-SCDMA System", Communication Technology Proceedings, 2000 WWC—ICCT 2000., International Conference On Beijing, vol. 1, pp. 152-155, (Aug. 21, 2000).

* cited by examiner

SYSTEM AND METHOD USING PRIMARY AND SECONDARY SYNCHRONIZATION CODES DURING CELL SEARCH

CROSS REFERENCE TO RELATED APPLICATION

This application claims priority from No. 60/334,345, filed Nov. 29, 2001, which is incorporated by reference as if fully set forth.

FIELD OF INVENTION

The present invention relates to the field of wireless communications. Specifically, the present invention relates to cell search in the Node B of a Time Division Duplex (TDD) system.

BACKGROUND

Current cell search in a Node B of a TDD system is based upon the use of the downlink synchronization (sync) timeslot. A ten (10) ms frame comprises two (2) subframes, each having a five (5) ms duration. Both subframes in a frame have the same overall structure. In principle, the meaning of "frame" is less relevant in low-chip rate (LCR) TDD, since a subframe is the basic repeating uplink (UL) and downlink (DL) time structure in a LCR TDD system.

The structure of a subframe is shown in FIG. 1. The subframe includes a Primary Common Control Physical Channel (P-CCPCH), a Downlink Pilot Timeslot (DwPTS), a Guard Period (GP) and an Uplink Pilot Timeslot (UpPTS). The first timeslot in the subframe is always used for the (DL) P-CCPCHs carrying the Broadcast Channel (BCH). The DwPTS field is used as a synchronization signal and includes a 32 chip guard period followed by a 64 chip DL sync code.

Since there is a one-to-one correspondence between scrambling codes and basic midamble codes in a TDD synchronously operating system, user signals are scrambled by 1 out of N scrambling codes, and 1 out of N basic midamble codes are used for channel estimation in a burst. Typically N is equal to 128. Furthermore, L scrambling codes-basic midambles belong to 1 out of M code groups. Since M is typically 32, and L=N/M, in the present example L=4. Each of the M code groups is indicated by a particular DL sync sequence in the DwPTS field. Neighboring Node Bs send a different DL sync sequence in their respective DwPTS fields.

The task of cell search is to identify the DL sync codes transmitted by a Node B, in order for the mobile or stationary user equipment (UE) to establish communications with the Node B. For example, a typical cell search must identify 1 out of 32 DL sync sequences by correlating each of 6400 chip positions in the five (5) ms subframe with each of 32 possible DL sync sequences in the system. Once a particular DL sync sequence is identified, (and since it is known that the P-CCPCH is using 1 out of 4 scrambling codes, each one tied to a particular basic midamble code), each of the four possibilities is tested by demodulating the P-CCPCH and checking with a threshold and/or CRC on its contents.

The presence of a P-CCPCH in the DL timeslot preceding the DwPTS field in the subframe, and the start of the BCH interleaving period, is indicated by a Quadrature Phase Shift Keying (QPSK) phase modulation pattern in the DwPTS field. The DL sync sequences are modulated with respect to the midamble (m(1)) in the first time slot (TS0). Four consecutive phases, (known as a phase quadruple), of the DL sync sequences are used to indicate the presence of the P-CCPCH in the following four subframes. In the case where the presence of a P-CCPCH is indicated, the next following subframe is the first subframe of the interleaving period. Since QPSK is used for the modulation of the DL sync sequences, the phases 45°, 135°, 225°, and 315° are used. The total number of different phase quadruples is 2, one for each P-CCPCH, (S1 and S2). In LCR TDD, the BCH is typically mapped to 2 physical channels, corresponding to 2 spreading codes in the same timeslot (TS) used for BCH data, (i.e. a P-CCPCH 1 known as S1 and a P-CCPCH 2 known as S2 in the DL timeslot preceding the DwPTS field). They are commonly referred to together as the "P-CCPCH", even though if it is well understood for LCR TDD that they actually may comprise two (2) physical channels present in the same TS. A quadruple always starts with an even system frame number ((SFN mod 2)=0). Table 1 sets fort the phase quadruples and their meaning.

| Name | Phase Quadruple | Meaning |
| --- | --- | --- |
| S1 | 135°, 45°, 225°, 135° | There is a P-CCPCH in the next 4 subframes |
| S2 | 315°, 225°, 315°, 45° | There is no P-CCPCH in the next 4 subframes |

Table 1

Every 64 chip DL sync sequence constitutes a QPSK symbol. The BCH on the P-CCPCH is interleaved over 2 frames (20 ms). The 4 consecutive subframes in these 2 frames contain one BCH segment protected with a CRC that can be checked. The 4 DL sync sequences within the 2 frames constitute 4 QPSK symbols, every single QPSK symbol gets an individual, differential phase offset compared to some easily measurable reference, such as the midamble in the PCCPCH. A full BCH segment (20 ms of data) can only start in a frame with even System Frame Number (SFN). If the QPSK modulation sequence S1 on the DL sync sequence contained in frame number n and number n+1 indicates presence of the P-CCPCH, the P-CCPCH can be found in frame numbers n+2 and n+3. Moreover, this segment will start in the first subframe of frame number n+2. The QPSK modulation sequences are made in a way that the UE can determine unambiguously within which subframe of frame numbers n and n+1 it is located.

Presently, the DL sync sequence has a length of only 64 chips, which does not provide much spreading gain. Often, a UE cannot synchronize reliably at cell borders, resulting in cell search performance that is relatively poor. Additionally, a UE receives relatively short DL sync sequences overlapping in time from neighboring Node Bs, leading to significant cross-correlation between the DL sync sequences from different Node Bs and further deteriorating detection performance.

The complexity of current cell search systems is very high. For example, the current 32 DL sync sequences are said to be randomly chosen sequences whose mutual cross-correlations are optimized. Each of these requires full correlation, (i.e. 64 chips long). Thus correlating 6400 chip positions requires 6400×32×64=13,107,200 operations per 5 ms subframe for cell search. This is an onerous processing requirement.

SUMMARY OF THE INVENTION

A system and method for improved LCR TDD cell searching includes a subframe having a Primary Synchronization Code, which is common to all Node Bs in the system and is used to indicate the positions of a set of Secondary Synchronization Codes. This greatly simplifies the cell searching procedure and improves cell search performance. In one embodiment, the Primary Synchronization Code is sent in the P-CCPCH and the Secondary Synchronization Codes are sent in the DwPTS timeslot.

BRIEF DESCRIPTION OF THE DRAWING(S)

DETAILED DESCRIPTION OF THE PREFERRED EMBODIMENT(S)

Figure 1:
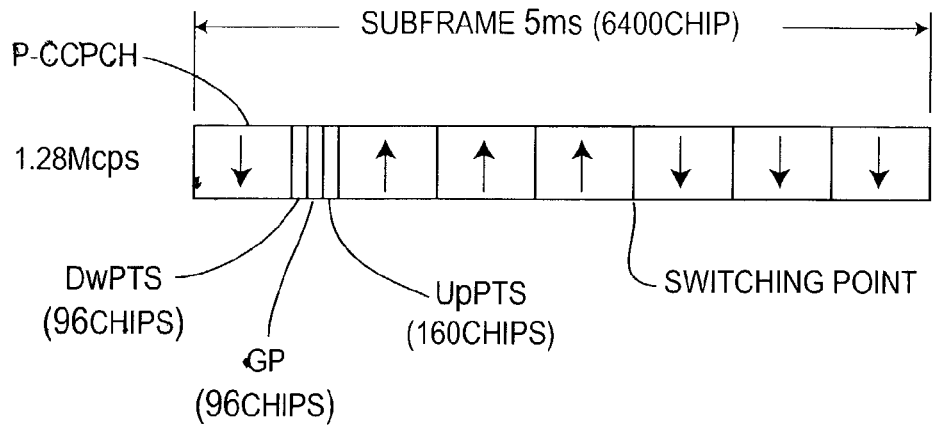
FIG. 1 is the structure of a subframe.

The present invention will be described with reference to the drawing figures where like numerals represent like elements throughout. As will be described in detail hereinafter, detection performance in the cell search process is improved by introduction of a Primary Synchronization Code (PSC), which is the same for all Node Bs in the system. The PSC indicates the positions of a set of Secondary Synchronization Codes (SSCs), which are unique to each Node B. The SSCs are preferably sent in the DwPTS timeslot and could be identical to the current 32 DL sync codes.

Detection complexity is decreased when the PSC is introduced into Node B. In the preferred embodiment, this PSC could be a reduced correlation complexity code, such as a Hierarchical Golay code with a correlation complexity of 0 (2*log(L)) instead of O(L).

Figure 2:
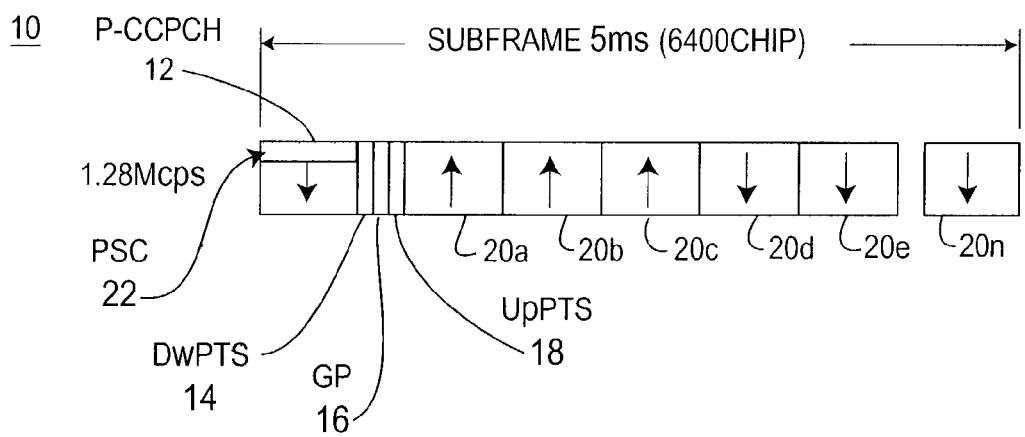
FIG. 2 is the structure of a subframe in accordance with a first embodiment of the present invention.
Figure 3:
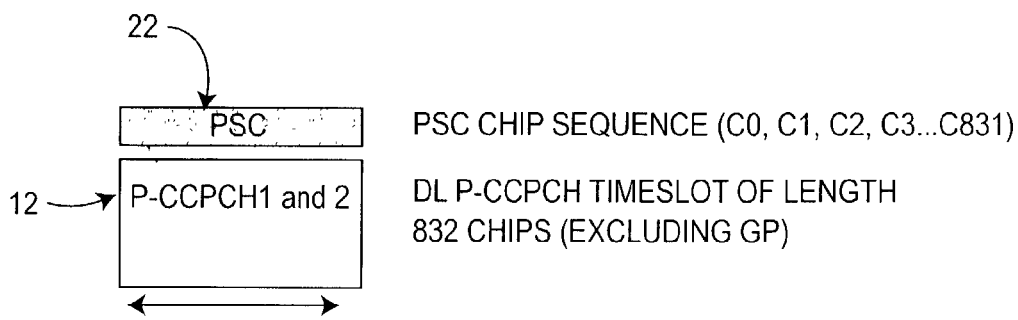
FIG. 3 is DL P-CCPCH timeslot of length 832 chips including the PSC chip sequence.

Referring to FIG. 2, a subframe 10 in accordance with the present invention is shown. The subframe 10 includes a P-CCPCH 12, a DwPTS 14, a GP 16, a UPPTS 18, and a plurality of data timeslots 20a-20n. In accordance with this embodiment of the present invention, the P-CCPCH 12 includes a PSC 22. This is shown in greater detail in FIG. 3. Although the PSC 22 indicates the location of the SSC, the PSC correlation peak does not indicate a single precise time instant where to find the SSC, but rather it indicates a number of possibilities (such as 16 or 32), as a function of how many code offsets for the PSC 22 exist.

As shown, the P-CCPCH 12 comprises a timeslot of length 832 chips excluding the guard period. The PSC chip sequence {C0, C1, C2, C3 ... C831} is sent simultaneously with each P-CCPCH. As shown in the transmitter 69 of FIG. 4, in the time interval corresponding to the first time slot (T0) of the P-CCPCH, the spreading sequences 70, 72 for P-CCPCHs 1 and 2 are sent along with the PSC chip sequence 64. These sequences 70, 72, 74 are chipwise added via an adder 76 to generate a composite chip sequence 78. A controller 80 places the composite sequence 78 into the proper timeslot (T0), and places information as appropriate in other timeslots, and the transmitter 82 transmits the data stream including the information in all the timeslots.

Figure 5:
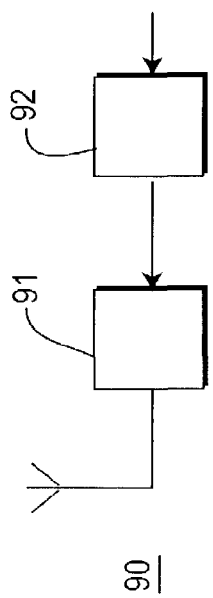
FIG. 5 is a block diagram of a receiver.

Referring to FIG. 5, a receiver 90 includes a data stream detector 91 and a data recovery device 92. The data stream detector 91 receives the data stream that has been transmitted. The data recovery device 92 recovers the data including decoupling the three chip sequences 70, 71, 72 which are forwarded for further processing.

In order to be able to receive a transmission signal reliably, a receiver must detect a certain amount of energy in the signal. Since energy is a function of power and time duration, in order to transmit the same amount of energy to receiver there are two basic choices: 1) transmit a signal with high power for a short duration; or 2) transmit a signal with low power for long duration. Using a longer spreading code results in a higher spreading gain which is much more advantageous for more resistance to channel variations and creates less interference to other Node Bs or UEs in the system. The 832 chip long sequence used in accordance with the preferred embodiment of the present invention is a low power, high spreading gain sequence.

Collision of PSCs sent by neighboring Node Bs should be avoided since when collisions do occur, the correlation peaks of the PSCs will potentially cancel out each other and result in fading. Due to the long length (832 chips) of the PSC, PSCs from different Node Bs may be distinguished in the time domain.

Figure 6:
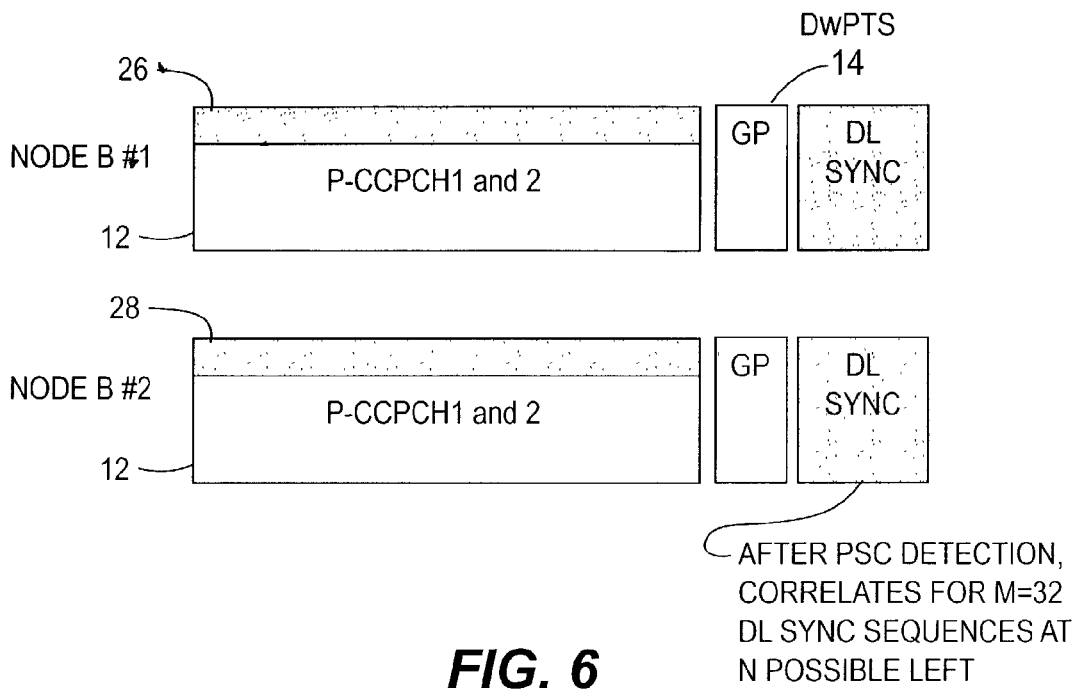
FIG. 6 illustrates distinguishing in the time domain two Node Bs for PSC detection.

Referring to FIG. 6, the Node Bs of different cells are differentiated by phase shifting the basic PSC sequence. For example, for Node B 1 the base PSC 26 sequence is {C0, C1, C2 ... C831}. The PSC 28 for Node B 2 is {C26 ... C831, C0, C1, C2 ... C25}, which is the same as the PSC 26 for Node B 1 except that it is offset by 26 chips.

It should be noted that although a PSC length of 832 has been chosen for the present invention, this has been selected for ease of explanation with respect to the example set forth herein. Greater or lesser PSC lengths could be used along with greater or lesser offsets, depending on the application and the number of Node Bs. Additionally, the size of the offset is not critical, nor does it have to be the same for each Node B.

Half-chip offsets are also possible, because usually CDMA receivers implement a feature known as oversampling for chip clock tracking. An oversampling of 2 means that they correlate at chips n, n+1/2, n+1, n+3/2, n+2, ... for chip tracking. The relationship is that overall length of PSC sequence is divided by an offset length to yield a number of different offsets in the system. If the PSC length is not evenly divisible by the offset length, one of the offsets may be longer or shorter. Accordingly, the sequence for the PSC 28 of Node B 2 is {C26 ... C831, C0, C1, C2 ... C25}. Thus, the PSC sequences from different Node Bs will be easily distinguished as their correlation peaks will appear sequentially in time. Enough time, (or chips), exist for separation for 32 cells (N=32) as shown in Equation 1:

$$\text{Chip Separation} = (\text{PSC chip length})/N. \quad \text{Equation 1}$$

In the present example, if the PSC is 832 chips long and the number of cells is 32, it results in a separation of 26 chips. The UE attempts to detect the PSC by performing periodic correlation on sliding 832 chip segments. The PSC can be found every 5 ms and reduces the uncertainty of where to find the DwPTS down to N=32 possibilities. Using this embodiment of the present invention, the DwPTS as currently specified by prior art systems remains, and the current N=32 DL sync sequences in the DwPTS act as secondary synchronization codes (SSCs).

Figure 7:
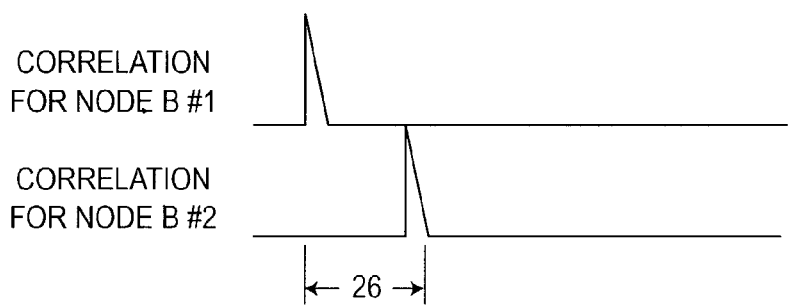
FIG. 7 is the correlation by the UE of the basic PSC sequence transmitted by two Node Bs.

Referring to FIG. 7, a correlation for Node B 1 is performed and, using a sliding window of 832 chips, a correlation for Node B 2 is performed. In the present example of FIG. 5, the Node Bs are separated by one "time offset" and the correlations will occur 26 chips apart. Of course, additional Node Bs will be separated in the time domain in the same manner as shown for Node Bs 1 and 2 of FIG. 5. The PSC has a 10×log (832/64)=11.1 dB higher spreading gain than a simple DL sync sequence. Because of its length, cross-correlation problems are much less likely than for current short DL sync sequences.

Since a periodic (i.e. wrap-around) correlation for the PSC must be performed, the PSC is preferably designed to correlate well periodically.

As those of skill in the art should realize, although the parameters N and M have been specifically set forth herein as particular values, they may be altered as desired for the particular application. For example, N=16 should be sufficient for separating neighboring Node Bs, but the value may be higher or lower as desired.

Using the present invention, a full correlation for the PSC results in 6400×832+32×32×64=5,324,800+65,535=5,390,335 operations per 5 ms period, which is a factor of 2.5 less than the 13,107,200 operations per 5 ms period as is currently performed. Allowing reduced complexity PSCs such as a Hierarchical-based code which can further reduce complexity by a factor of 16-32, overall complexity for the cell search method and system in accordance with the present invention may be reduced to 171,000-350,000 operations per 5 ms period.

Figure 4:
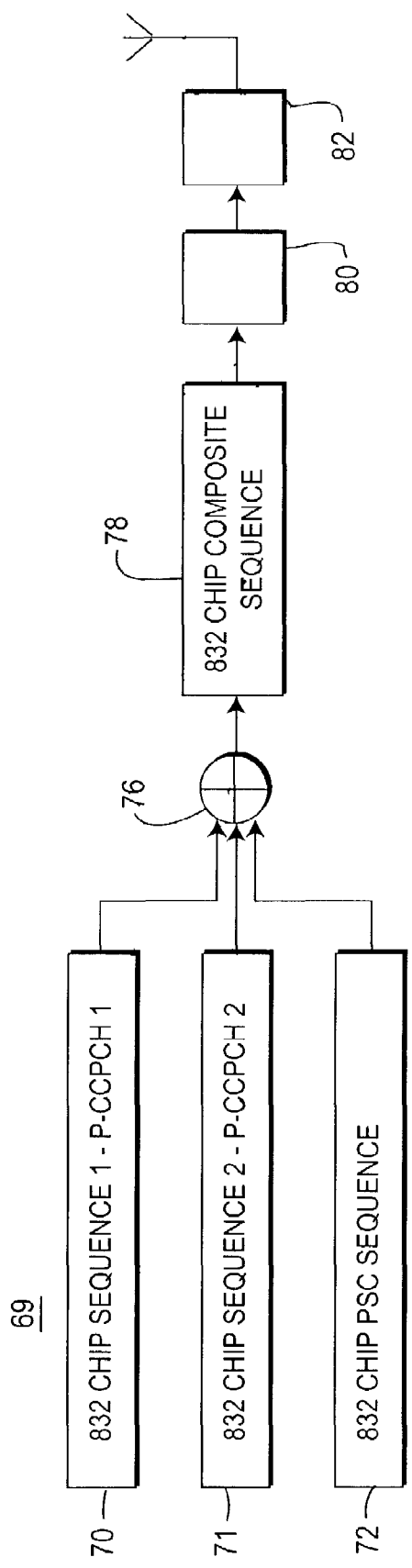
FIG. 4 is a block diagram of a transmitter combining the PSC sequence with the P-CCPCH prior to transmission.
Figure 8:
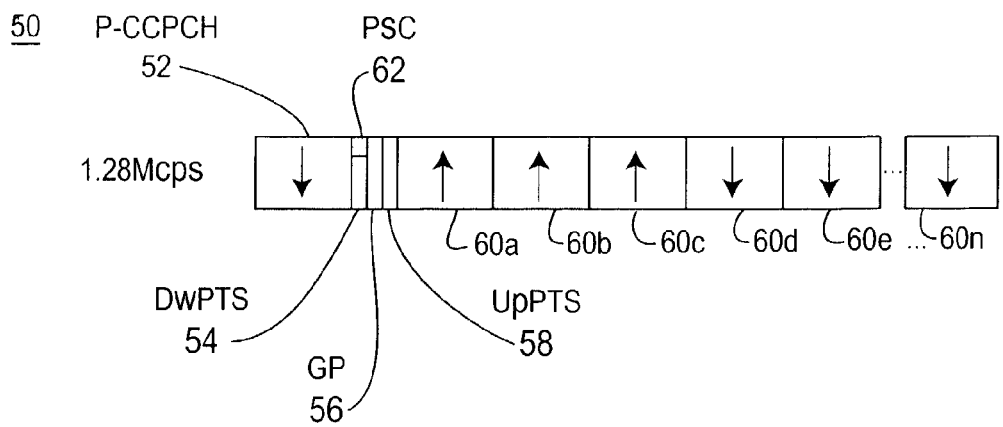
FIG. 8 is the structure of a subframe in accordance with a second embodiment of the present invention.

Referring to FIG. 8, a subframe 50 of a second embodiment of the present invention is shown. This subframe 50 includes a P-CCPCH 52, a DwPTS 54 a GP 56, a UpDTS 58, and a plurality of data timeslots 60*a*-60*n*. The subframe 50 of this embodiment includes a DwPTS 54 which has been modified to include the PSC 62. The PSC 62 is included in the DwPTS54 in the same manner as shown in FIG. 4, except that the PSC in this case will be shorter, (i.e., only 64 chips). A UE would then receive the PSC 62 and a DL sync sequence (as the SSC) in the DwPTS 54. Since only 64 chips are available for the PSC 62 in DwPTS 54 of this embodiment, this embodiment is somewhat less efficient.

While the present invention has been described in terms of the preferred embodiment, other variations, which are within the scope of the invention as outlined in the claims below will be apparent to those skilled in the art.

What is claimed is:

1. A method for cell searching for time division duplex (TDD) communication, the method comprising:

detecting a primary synchronization code (PSC) transmitted in one of a plurality of timeslots in a subframe, the PSC being common to all Node Bs and being transmitted with a Node B-specific cyclic code shift by each of the Node Bs; and detecting a secondary synchronization code (SSC) transmitted in one of the timeslots in the subframe based on the detected PSC, the SSC being unique to a specific group of Node Bs;

wherein a chin separation defined by the cyclic code shift is equal to a PSC chip length divided by the number of cells.

2. The method of claim 1 wherein the PSC is sent in a primary common control physical channel (P-CCPCH) and the SSC is sent in a downlink pilot time slot (DwPTS).

3. The method of claim 1, wherein a downlink pilot time slot (DwPTS) comprises the PSC.

4. The method of claim 3, wherein the DwPTS further comprises the SSC.

5. A Node B for communicating using a wireless time division duplex/code division multiple access (TDDICDMA) format, the Node B comprising:

a generator for generating a Primary Common Control Physical Channel (PCCPCH) including a Primary Synchronization Code (PSC), and for generating a Downlink Pilot Timeslot (DwPTS) including at least one Secondary Synchronization Code (SSC), the PSC being common to all Node-Bs and indicating the location of the SSC which is unique to a specific group of Node Bs, the PSC being transmitted with a Node B-specific cyclic code shift;

a timeslot controller for placing the P-CCPCH in one of timeslots of a subframe, placing the DwPTS in one of the timeslots in the subframe and creating a data stream; and a transmitter for transmitting the data stream;

wherein a chip separation defined by the cyclic code shift is equal to a PSC chip length divided by the number of cells.

6. The Node B of claim 5, wherein the P-CCPCH is located in a first timeslot and the DwPTS is located in a second timeslot.

7. A Node B for communicating using a wireless time division duplex/code division multiple access (TDDICDMA) format, the Node B comprising:

a first generator for generating a primary synchronization channel, a primary synchronization code (PSC) which is common to all Node Bs being transmitted with a Node B-specific cyclic code shift via the primary synchronization channel;

a second generator for generating a secondary synchronization channel which is related to said primary synchronization channel, a secondary synchronization code (SSC) which is unique to a specific group of Node Bs being transmitted via the secondary synchronization channel;

a controller for placing the primary synchronization channel in a first timeslot and the secondary synchronization channel in a second timeslot to create a data stream; and a transmitter for transmitting the data stream;

wherein a chip separation defined by the cyclic code shift is equal to a PSC chip length divided by the number of cells.

8. The Node B of claim 7, wherein a downlink pilot time slot (DwPTS) comprises the PSC.

9. The method of claim 8, wherein the DwPTS further comprises the SSC.

10. A User Equipment (UE) that supports cell searching using a wireless time division duplex/code division multiple access (TDDICDMA) format, the UE comprising:

a receiver for detecting a data stream, the data stream comprising a primary synchronization code (PSC) transmitted in one of a plurality of timeslots in a subframe and a secondary synchronization code (SSC) transmitted in one of the timeslots in the subframe, the PSC being common to all Node Bs and transmitted with a Node B-specific cyclic code shift by each of the Node Bs, and the SSC being unique to a specific group of Node Bs; and a data recovery device for recovering the SSC;

wherein a chip separation defined by the cyclic code shift is equal to a PSC chip length divided by the number of cells.

11. The UE of claim 10, wherein the PSC indicates the location of the SSC.

12. The UE of claim 10, wherein the PSC is located within a Primary Common Control Physical Channel (P-CCPCH).

13. The UE of claim 10, wherein the SSC is located within a Downlink Pilot Timeslot (DwPTS).

14. The method of claim 10, wherein a downlink pilot time slot (DwPTS) comprises the PSC.

15. The method of claim 14 wherein the DwPTS further comprises the SSC.

* * * * *

UNITED STATES PATENT AND TRADEMARK OFFICE
CERTIFICATE OF CORRECTION

PATENT NO.         : 7,693,123 B2
APPLICATION NO.    : 10/307082
DATED              : April 6, 2010
INVENTOR(S)        : Marian Rudolf It is certified that error appears in the above-identified patent and that said Letters Patent is hereby corrected as shown below:

IN THE CLAIMS

At claim 1, column 5, line 58, after the word "a", delete, "chin" and insert therefor --chip--.

At claim 5, column 6, line 2, after the word "access" delete, "(TDDICDMA)" and insert therefor --(TDD/CDMA)--.

At claim 7, column 6, line 24, after the word "access" delete, "(TDDICDMA)" and insert therefor --(TDD/CDMA)--.

At claim 9, column 6, line 50, after the word "access" delete, "(TDDICDMA)" and insert therefor --(TDD/CDMA)--.

Signed and Sealed this
Thirty-first Day of May, 2011

David J. Kappos
*Director of the United States Patent and Trademark Office*